United States Patent
Blaizot

(10) Patent No.: US 7,158,724 B2
(45) Date of Patent: Jan. 2, 2007

(54) METHOD OF DETECTING SWITCHING SUBNODES FOR SWITCHING WAVELENGTH DIVISION MULTIPLEXES

(75) Inventor: Caroline Blaizot, Montigny le Bretonneux (FR)

(73) Assignee: Alcatel, Paris (FR)

( * ) Notice: Subject to any disclaimer, the term of this patent is extended or adjusted under 35 U.S.C. 154(b) by 807 days.

(21) Appl. No.: 09/963,514

(22) Filed: Sep. 27, 2001

(65) Prior Publication Data

US 2002/0039216 A1 Apr. 4, 2002

(30) Foreign Application Priority Data

Oct. 2, 2000 (FR) .................................. 00 12511

(51) Int. Cl.
*H04J 14/00* (2006.01)
(52) U.S. Cl. ............................ 398/45; 398/46; 398/48; 398/74
(58) Field of Classification Search ................. 398/45, 398/46, 48, 49, 55, 56, 50, 79, 9, 47, 51, 398/54, 57, 74, 75; 370/238, 230, 360, 380, 370/386, 437; 709/238–242
See application file for complete search history.

(56) References Cited

U.S. PATENT DOCUMENTS

| | | | | |
|---|---|---|---|---|
| 5,457,556 | A * | 10/1995 | Shiragaki | 398/50 |
| 6,587,240 | B1 * | 7/2003 | Lacey et al. | 398/82 |
| 6,647,208 | B1 * | 11/2003 | Kirby | 398/45 |
| 6,876,649 | B1 * | 4/2005 | Beshai | 370/355 |
| 6,882,799 | B1 * | 4/2005 | Beshai et al. | 398/45 |
| 2002/0030864 | A1 * | 3/2002 | Chaudhuri et al. | 359/110 |
| 2002/0064336 | A1 * | 5/2002 | Graves et al. | 385/17 |

OTHER PUBLICATIONS

"Optical Path Cross Connect System Using Matrix Wavelength Division Multiplex Scheme" Harada et al. IEICE Transactions on Electronics, Institute of Electronics Information and Comm. Eng. Tokyo. vol. E82-C Feb. 1999, pp. 292-295.
"Routing and Multiplex Bundling in a Transmission Network:" Proceedings of the Intl. Teletraffic Congress, Amsterdam, Jun. 1991 pp. 401-406, Hoesel et al.
"Hierarchical Optical Pcth Cross-Connect Systems for Large Scale WDM Networks" IEEE OFC/IOOC '99, p. 356-358, Harada et al.
"Lambda-Labeling: A Framework for IP-Over-WDM Using MOLS" Optical Networks Magazine, pp. 45-58. N. Ghani., Apr. 2000.

* cited by examiner

*Primary Examiner*—Dalzid Singh
(74) *Attorney, Agent, or Firm*—Sughrue Mion, PLLC

(57) ABSTRACT

A method of detecting switching subnodes in a monoblock wavelength division multiplex optical switching node, each subnode corresponding to a given level of granularity and to a given switching function. The method includes collecting information concerning how traffic is crossing an initial monoblock switching node, defining the granularity and switching function of the subnodes to be detected, considering each subnode successively in an order corresponding to reducing switching constraints and, for each subnode, selecting all or part of the traffic of an incoming granularity and an outgoing granularity that satisfy the switching constraints of the subnode concerned.

15 Claims, 7 Drawing Sheets

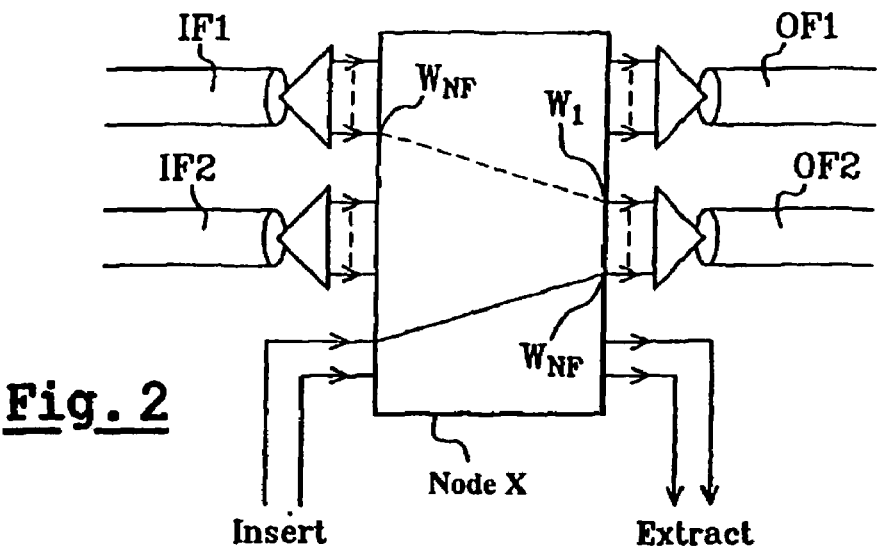
Fig. 2
| Wavelength | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ |
|---|---|---|---|---|---|---|---|---|---|---|---|---|
| Band 1 with three wavelengths per band 1 | B11 | | | B12 | | | B13 | | | B14 | | |
| Band 2 with two bands 1 per band 2 | B21 | | | | | | B22 | | | | | |
| Fiber | Fiber | | | | | | | | | | | |
Fig. 3
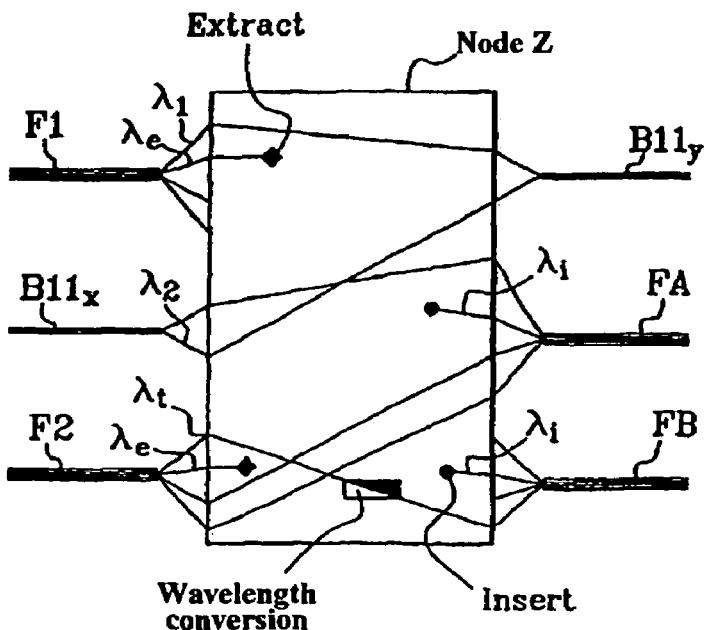
Fig. 4

METHOD OF DETECTING SWITCHING SUBNODES FOR SWITCHING WAVELENGTH DIVISION MULTIPLEXES

CROSS-REFERENCE TO RELATED APPLICATIONS

This application is based on French Patent Application No. 00 12 511 filed Oct. 2, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of detecting subnodes of an optical switch for switching wavelength division multiplexes. Wavelength division multiplexes are used to transmit data in optical fiber networks. The invention applies to optical wavelength division multiplex transmission networks and to equipment units of such networks, such as optical switches.

2. Description of the Prior Art

At present, data is transmitted in optical networks on light beams corresponding to a plurality of wavelengths, with a bit rate of the order of 10 Gbit/s ($10^9$ bit/s). The light beams are transmitted by optical fibers. To route data across the network it is necessary to provide wavelength division multiplex switching blocks. The technology of these switches enables the incoming signal to be switched directly in its optical form. There is no need to transform light signals into electrical signals in order to switch them. The optical switches receive at their input a number of optical fibers each corresponding to a plurality of wavelengths. On reaching the optical switch, the light signal is wavelength division demultiplexed and each wavelength then arrives a port of the optical switch that switches it to an outgoing fiber. The wavelengths are remultiplexed at the output of the switch. The switches or switching nodes are therefore "monoblock" nodes in the sense that they can switch only wavelengths. These switching blocks must therefore be allocated as many input and output ports as there are wavelengths to be switched.

There is at this time a very considerable expansion of telecommunications, reflected in increased requirements for data transmission. Optical fiber transmission has not escaped this phenomenon and the quantity of data transmitted by optical networks has increased considerably. From now on, optical fibers will have to be designed to transmit more and more wavelengths. It is currently possible to transmit up to 256 wavelengths per optical fiber.

The switching nodes in optical networks receive more and more fibers and therefore more and more wavelengths to be switched. To give a concrete example, an optical switch might have to switch 100 fibers each carrying 160 wavelengths, each wavelength providing a data bit rate of 10 Gbit/s ($10^9$ bit/s). The total bit rate to be switched is then 160 Tbit/s ($10^{12}$ bit/s). The total number of incoming wavelengths is 16 000. To switch all the wavelengths individually, it would be necessary to design an optical switch with a very large number (16 000×16 000) of input and output ports, which is not feasible with present-day optical switching matrices. Controlling such matrices electrically would become too complex because of the very large number of switching points.

With nodes of the above size, one might imagine that some of the traffic would come from the same direction and go in the same direction. One solution to the problem of reducing the number of ports is therefore to group the wavelengths into bands and to switch them together, so that a portion of the traffic could be switched simultaneously by using a single port for a plurality of wavelengths.

More generally, to reduce the number of ports, one might wish to switch a portion of the total traffic at fiber level, another portion at band level and a final portion at wavelength level. Switching complete wavelength division multiplexes, i.e. switching fibers, bands of wavelengths and wavelengths, in the same optical node corresponds to different switching capacities. In this configuration, planning wavelength division multiplex networks is based on optical switches which have a "multigranularity" architecture.

The "granularity" concept relates to predefined sets of transmission resources (typically carrier wavelengths or wavelength division multiplexes) where the resources of a set can be treated as a whole for some common processing (typically switching). A "multigranularity" architecture therefore takes account of different levels of granularity for switching the total traffic of a switch. For example, a portion of the total traffic might be switched at the "fiber" level, i.e. by grouping all of the wavelengths that can be conveyed by an optical fiber, which thus corresponds to the highest level of granularity. Another portion might be switched at the band of wavelengths level, which corresponds to an intermediate level of granularity. A final portion might be switched at the wavelength level, which corresponds to the lowest level of granularity. Further intermediate levels of granularity can be defined.

FIG. 1 is a block diagram of a prior art optical switching node with a multigranularity architecture. The multigranularity architecture has led to a change from monoblock switching nodes to switching nodes consisting of a stack of subnodes. Each switching subnode is defined by a level of granularity. Thus the figure shows a switching subnode FXC at the fiber level of granularity, a switching subnode BXC at the band level of granularity, and a switching subnode WXC at the wavelength level of granularity.

In FIG. 1, the incoming fibers IF are first routed to the input ports IP of the switching subnode FXC. A few of the incoming fibers IF are switched directly to the output fibers OF via the output ports OP of the switching subnode FXC. A fiber AF coming from the client is directly inserted at a fiber insertion port $P_{ins}$ of the switching subnode FXC. A fiber DF sent to the client is extracted from a fiber extraction port $P_{ext}$ of the subnode FXC. The fiber DF must be wavelength division demultiplexed for the client, but the demultiplexers are not shown in the figure. Fibers $F_{bf}$ are inserted from the switching subnode BXC to the fiber insertion ports $P_{ins}$ of the subnode FXC. These fibers $F_{bf}$ come from the band to fiber multiplexer Mux B→F which multiplexes the bands coming from the output ports OP of the switching subnode BXC. Finally, fibers $F_{fb}$ are extracted from the subnode FXC via extraction ports and are sent to the input ports IP of the subnode BXC after the fibers are demultiplexed into bands in the fiber to band demultiplexer Demux F→B.

The same switching process is used at the next lower level of granularity, i.e. in the switching subnode BXC at the band level of granularity, as well as at the lowest level of granularity, i.e. in the switching subnode WXC at the wavelength level of granularity.

A few of the bands arriving at the input ports IP of the subnode BXC are switched to the output ports OP of the subnode BXC. A band AB coming from the client is directly inserted at an insertion port of the subnode BXC. A band DB sent to the client is extracted via an extraction port $P_{ext}$ of the subnode BXC. The band DB must be wavelength division demultiplexed for the client, but the demultiplexers are not shown in the figure. Bands $B_{\lambda b}$ are inserted from the switching subnode WXC at the insertion ports $P_{ins}$ of the subnode BXC. These bands $B_{\lambda b}$ come from the multiplexer Mux λ→B which multiplexes wavelengths from the output ports OP of the switching subnode WXC into bands. Finally, bands $B_{b\lambda}$ are extracted from the subnode BXC via extraction ports and are sent to the input ports IP of the subnode WXC after the bands are demultiplexed into wavelengths in the band to wavelength demultiplexer Demux B→λ.

The same switching process is used again in the subnode WXC. A few of the wavelengths arriving at the input ports IP of the subnode WXC are switched to the output ports OP of the subnode WXC. Wavelengths Aλ coming from the client are directly inserted at insertion ports $P_{ins}$ of the subnode WXC. Wavelengths Dλ sent to the client are extracted via extraction ports of the subnode WXC.

The network is planned without any specification at the level of the nodes. Traffic routing is based on an algorithm that yields the shortest path in terms of distance. Resources are allocated to the network at the wavelength level. Although planning is based only on the wavelength level of granularity, a great part of the traffic at each optical switching node can be processed at the fiber and band levels, as if this were "natural". At a switching node, either the whole of the multiplex or only a portion of the multiplex comes from the same incoming fiber and goes to the same outgoing fiber. The problem is precisely to quantify the portions of the traffic that must be switched at the fiber, band and wavelength levels of granularity.

Accordingly, the technical problem that arises is that of finding a means of detecting the switching subnodes actually required and therefore of providing a method of subdividing the switching matrix of the initial node.

One object of the present invention is specifically to provide a method of detecting subnodes in an optical switching node so that it is possible to determine the traffic at and the size of each subnode. The method according to the invention therefore optimizes the number of ports needed at an optical switching node and thereby optimizes switching costs by using the highest levels of granularity for switching whenever possible.

To this end, the invention starts from the initial switching matrix of the monoblock node whose subnodes are to be detected. For each subnode, the invention then selects the fibers, bands of wavelengths or wavelengths complying with the switching constraints corresponding to that subnode. Which portion of the traffic at each node can be processed in such a subnode is detected. The switching constraints are translated into incoming fiber/outgoing fiber terms and more generally into incoming granularity/outgoing granularity terms, as well as into wavelength translation/band translation terms. The detection method is implemented by an algorithm defining all the necessary detection steps.

SUMMARY OF THE INVENTION

The invention therefore provides a method of detecting switching subnodes in a monoblock wavelength division multiplex optical switching node, each subnode corresponding to a given level of granularity and to a given switching function, which method includes the following steps:

(a) collecting information concerning how traffic is crossing the initial monoblock switching node;
(b) defining the granularity and switching function of the subnodes to be detected;
(c) considering each subnode successively in an order corresponding to reducing switching constraints; and
(d) for each subnode, selecting all or part of the traffic of an incoming granularity and an outgoing granularity that satisfy the switching constraints of the subnode concerned.

Other features and advantages of the invention will become more clearly apparent on reading the following description of one particular embodiment of the invention, which description is given with reference to the accompany drawings.

BRIEF DESCRIPTION OF THE DRAWINGS

FIG. 2 is a diagram of an optical node showing how the traffic crosses the initial monoblock node.

FIG. 3 is a summary table of the granularities considered in implementing a method according to the invention.

FIG. 4 is a diagram showing the ricochet function for verifying a link with a conversion.

DETAILED DESCRIPTION OF THE PREFERRED EMBODIMENT

Figure 1:
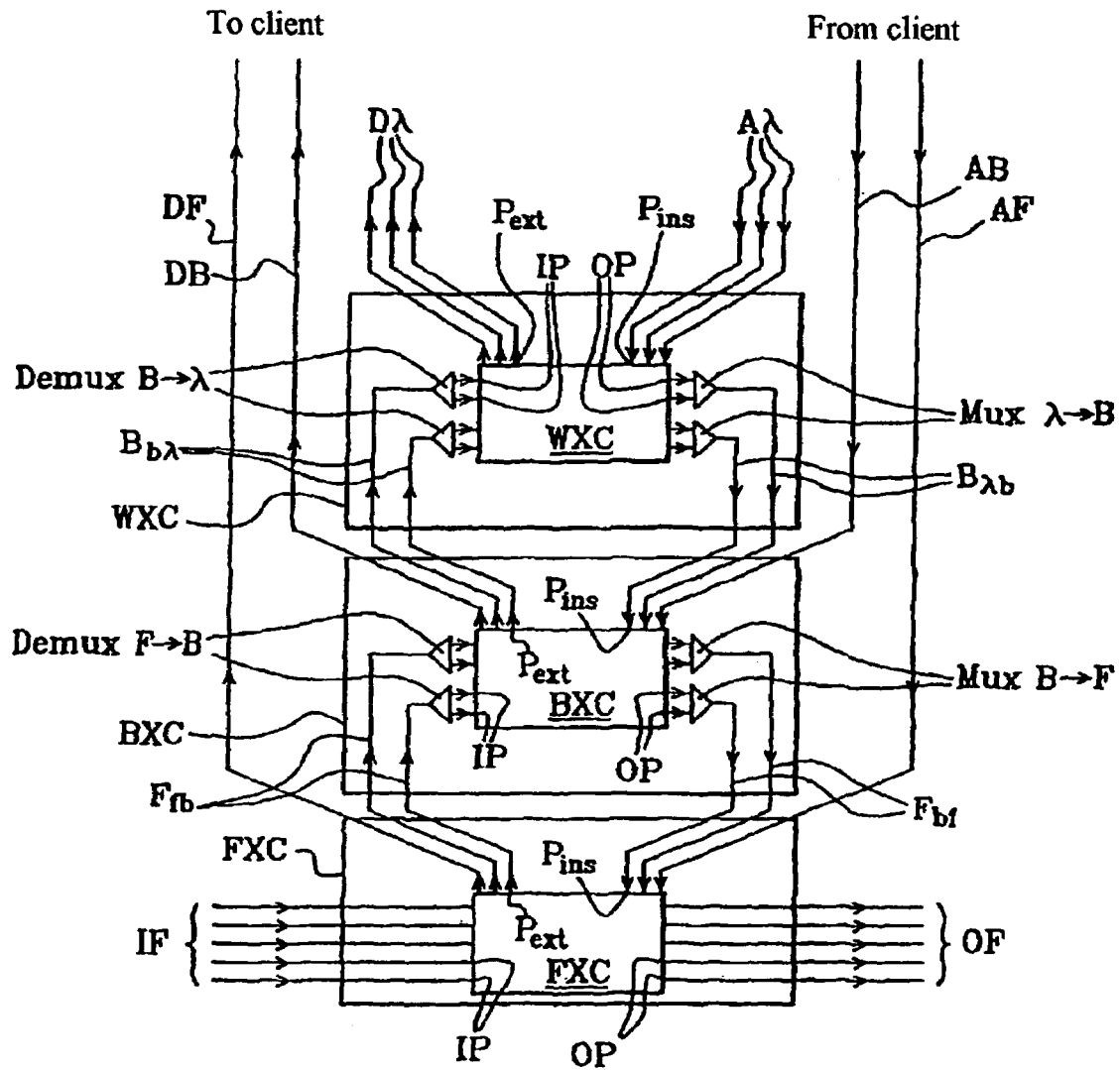
FIG. 1 is a block diagram of a prior art multigranularity architecture optical switching node, as described in the above preamble.

The method according to the invention is described for a situation in which four subnodes have be detected, i.e. in which four granularities are considered, but this must not be seen as limiting in any way the scope of the invention.

The first phase of the method according to the invention consists of collecting from the network information concerning the manner in which the traffic is crossing the initial monoblock node. The input parameters of the algorithm implementing the detection method according to the invention are defined at this stage.

As input, the detection method starts with information from the manufacturer of the network and contained in the initial switching matrix of the monoblock node whose subnodes are to be detected. That information concerns the routing of data and the allocation of resources in the network. In other words, the method requires a knowledge of, for each optical path:

the wavelength at which the traffic enters and leaves the node,
if the wavelength is added or extracted, and, finally
from which fiber the wavelength has come and to which fiber it is going.

The above information, which is necessary for implementing the method according to the invention, is described with reference to FIG. 2.

FIG. 2 is a diagram of a monoblock optical node X with two incoming fibers IF1 and IF2 and two outgoing fibers OF1 and OF2. The figure shows how the traffic crosses the initial monoblock node and one example of the type of input information available to the method. Thus the optical path shown in dashed line comes from the first incoming fiber IF1 with the last wavelength Wnf of the multiplex and goes to the second output fiber OF2 with the first wavelength W1 of the multiplex. The optical path shown in continuous line is inserted and goes to output fiber number 2 OF2 with the last wavelength Wnf of the multiplex.

The second phase of the detection method in accordance with the invention consists of defining the level of granularity and the switching function of the subnodes to be detected.

A subnode is defined partly by its level of granularity and partly by the switching function associated with it. For the method according to the invention, four granularities are considered and are set out in the table in FIG. 3:

wavelengths $\lambda 1, \lambda 2, \lambda 3, \ldots, \lambda 12$,
bands 1 of wavelengths B11, B12, B13, B14,
bands 2 of bands 1 B21, B22, and
fiber.

In this example, N=12 is the number of wavelengths per fiber, N1=3 is the number of wavelengths per band 1, and N2=6 is the number of wavelengths per band 2.

The complete multiplex comprises the twelve wavelengths $\lambda 1, \lambda 2, \lambda 3, \ldots \lambda 12$. The four bands 1 (B11, B12, B13, B14) each comprise three wavelengths. Thus B11 comprises the wavelengths $\lambda 1, \lambda 2$ and $\lambda 3$; B12 comprises the wavelengths $\lambda 4, \lambda 5$ and $\lambda 6$; B13 comprises the wavelengths $\lambda 7, \lambda 8$ and $\lambda 9$; and B14 comprises the wavelengths $\lambda 10, \lambda 11$ and $\lambda 12$. The two bands 2: B21 and B22 each comprise two bands 1, i.e. six wavelengths. Thus B21 comprises six wavelengths $\lambda 1$ to $\lambda 6$ and B22 comprises six wavelengths $\lambda 7$ to $\lambda 12$.

The switching functions available are "with translation" and "without translation". The translations can be wavelength translations or band translations.

With a wavelength translation, any wavelength can be changed into any other wavelength. With a band translation, all the wavelengths of a band are translated to the wavelengths of another band. For example, band B11 in the FIG. 3 table, which comprises the wavelengths $\lambda 1, \lambda 2$ and $\lambda 3$, can be translated to band B13, which comprises the wavelengths $\lambda 7, \lambda 8$ and $\lambda 9$.

The subnodes to be detected by the method in accordance with the invention, and which are the result of the granularities and switching functions as previously described with reference to FIG. 3, are as follows:

the fiber level optical switching subnode: F-OXC,
the band 2 level optical switching subnode with a direct routing function, i.e. with no band translation: B2R-OXC,
the band 2 level optical switching subnode with band translation: B2T1 OXC,
the band 1 level optical switching subnode with a direct routing function, i.e. with no band translation: B1R-OXC,
the band 1 level optical switching subnode with band translation: B1T-oxc,
the wavelength level optical switching subnode with a direct routing function, i.e. with no wavelength translation: WR-OXC, and
the wavelength level optical switching subnode with wavelength translation: WT-OXC.

Thus there are two different switching blocks at the same level of granularity, one with translation and the other without translation. The optical switching node can therefore be regarded as a stack of seven blocks.

Two other blocks corresponding to the insert/extract multiplexer can also be defined:

the subnode corresponding to the insert/extract multiplexer with a direct routing function, i.e. with no wavelength translation: WR-OADM, and the subnode corresponding to the insert/extract multiplexer with wavelength translation: WT-OADM.

It is not possible to mix the content of the fibers in the configuration of the sub-blocks WR-OADM and WT-OADM. The wavelengths can simply be extracted from the fiber or inserted in the fiber, but always the same fiber.

The switching method enables traffic to go from one subnode to another, thereby generating internal traffic in the optical switching node. However, the detection method in accordance with the invention imposes a constraint on this internal traffic. That constraint is as follows: no internal traffic can be generated between subnodes that have the same level of granularity. For a given subnode, the method cannot switch one portion of the multiplex with wavelength translation and the other portion of the multiplex with no translation. In this case, if a single translation is detected, it will be necessary to switch everything in the subnode that has the translation function. Because of this constraint on internal traffic, before selecting the resources (multiplex, bands, subbands or wavelengths) for a given switching subnode with no translation function, i.e. a routing subnode, it must be verified that the resources are not linked to any other wavelength translation. In other words, it is necessary to verify that a granularity is not tied to any translation before detecting it as having to be switched in a routing subnode. If the above constraint were not imposed, the method in accordance with the invention would lead to detection errors. To comply with the above constraint, the detection algorithm applies a verification function referred to as a ricochet function for verifying the link with a conversion. That function is described with reference to FIG. 4.

FIG. 4 shows one example of the application of the ricochet function for verifying the link with a conversion based on a wavelength granularity. FIG. 4 shows a switching node Z with incoming and outgoing granularities. The incoming granularities comprise two fibers F1 and F2 and a band of wavelengths $B11_X$ from a node X. The outgoing granularities comprise two fibers FA and FB and a band of wavelengths $B11_Y$ to a node Y. The shaded lozenges signify an end of connection. The wavelengths referenced $\lambda e$ in the figure are thus extracted from the node Z via extraction ports, not shown. The shaded circles signify that traffic is inserted into the node. The wavelengths referenced $\lambda i$ are therefore inserted into the node Z via insertion ports, not shown. The half-shaded rectangle signifies a link with a wavelength conversion. The wavelength $\lambda t$ is therefore subject to a translation.

In this example, the traffic from the fiber F1 is not linked with any wavelength conversion, and could therefore be switched in a subnode WR-OXC. However, the link with a conversion of the first wavelength $\lambda t$ of the fiber F2 makes it obligatory to switch all the traffic in a WT-OXC type subnode. The example shows how the verification function works in this specific situation to detect the link with a wavelength conversion.

The ricochet verification function is applied to the first wavelength $\lambda 1$ of the fiber F1. The following process is started:

the function verifies that no wavelength of the incoming multiplex F1 has changed,
the function verifies that no wavelength of the outgoing multiplex $B11_Y$ has changed, and
the function is also applied to all the wavelengths constituting the incoming multiplex of the wavelengths constituting the outgoing multiplex, which explains the use of the term "ricochet" to describe this effect.

In the FIG. 4 example, the verification function is therefore invoked for the first wavelength $\lambda 1$ of the fiber F1 and for the second wavelength $\lambda 2$ of the band $B11_X$. There is provision for marking a wavelength to indicate that it has already been verified, which eliminates redundant tests. This is the case for the first wavelength $\lambda 1$ of the fiber F1, which has already been verified.

The ricochet verification function is therefore applied to the second wavelength $\lambda 2$ of the band $B11_X$. As in the previous step, the following process is started:

the function verifies that no wavelength of the incoming multiplex $B11_X$ has changed; starting from this incoming multiplex $B11_X$, the function will be obliged to test two outgoing multiplexes $B11_Y$ and FA, and so:

the function verifies that no wavelength constituting the outgoing multiplex $B11_Y$ has changed, the function verifies that no wavelength constituting the outgoing multiplex FA has changed, the function applies the ricochet effect, starting from the first outgoing multiplex considered, $B11_Y$; the ricochet verification function is invoked for all the wavelengths constituting the incoming multiplex of the wavelengths constituting the outgoing multiplex $B11_Y$, i.e. the first wavelength $\lambda 1$ of the fiber F1 and the second wavelength $\lambda 2$ of the band $B11_X$; because the wavelengths are marked, it is known that these wavelengths have already been tested; there is therefore no utility in invoking the verification function for these wavelengths; and the function applies the ricochet effect on the basis of the other outgoing multiplex considered, i.e. the fiber FA; the ricochet verification function is invoked for all the wavelengths constituting the incoming multiplex of the wavelengths constituting that outgoing multiplex FA, i.e. the wavelengths of the fiber F2 and the band $B11_X$; the wavelengths of the band $B11_X$ have already been tested.

The ricochet verification function is therefore applied with the first wavelength $\lambda t$ of the fiber F2. The same process is started as in the preceding steps: the function verifies that no wavelength of the incoming multiplex F2 has changed. There is a wavelength conversion. The function detects that conversion and processing of the incoming multiplex F2 is stopped. It is then known that the traffic cannot be switched in a WR-OXC type routing subnode.

The ricochet function for verifying the link with a conversion is therefore applied in three steps which are looped. Generally speaking, a first step first verifies that none of the wavelengths of an incoming granularity is linked with a translation. A second step consists of verifying that none of the wavelengths of the outgoing granularity or granularities corresponding to the incoming granularity is tied to a translation. The incoming and outgoing granularities are said to correspond when they have wavelengths in common. Finally, a third step implements the ricochet verification function. That step consists of applying the function of verification of the link with a conversion again, for each incoming granularity, to all of the wavelengths constituting the incoming granularity of the wavelengths constituting the outgoing granularity.

Application of this ricochet verification function to the method of detecting subnodes is described below with reference to FIGS. 5A and 5B.

The method in accordance with the invention is described with reference to FIGS. 5A and 5B, which show all of the steps of the various phases of the method in accordance with the invention, and how they are strung together. Note that the dashed blocks in FIGS. 5A and 5B represent comments and not steps of the algorithm.

These figures show again the first two phases of the method in accordance with the invention already described in detail with reference to FIGS. 2 and 3, namely the phase a of collecting information concerning how the traffic is crossing the initial monoblock node and the phase b of defining the granularity and switching function of the subnodes to be detected.

Figure 5A:
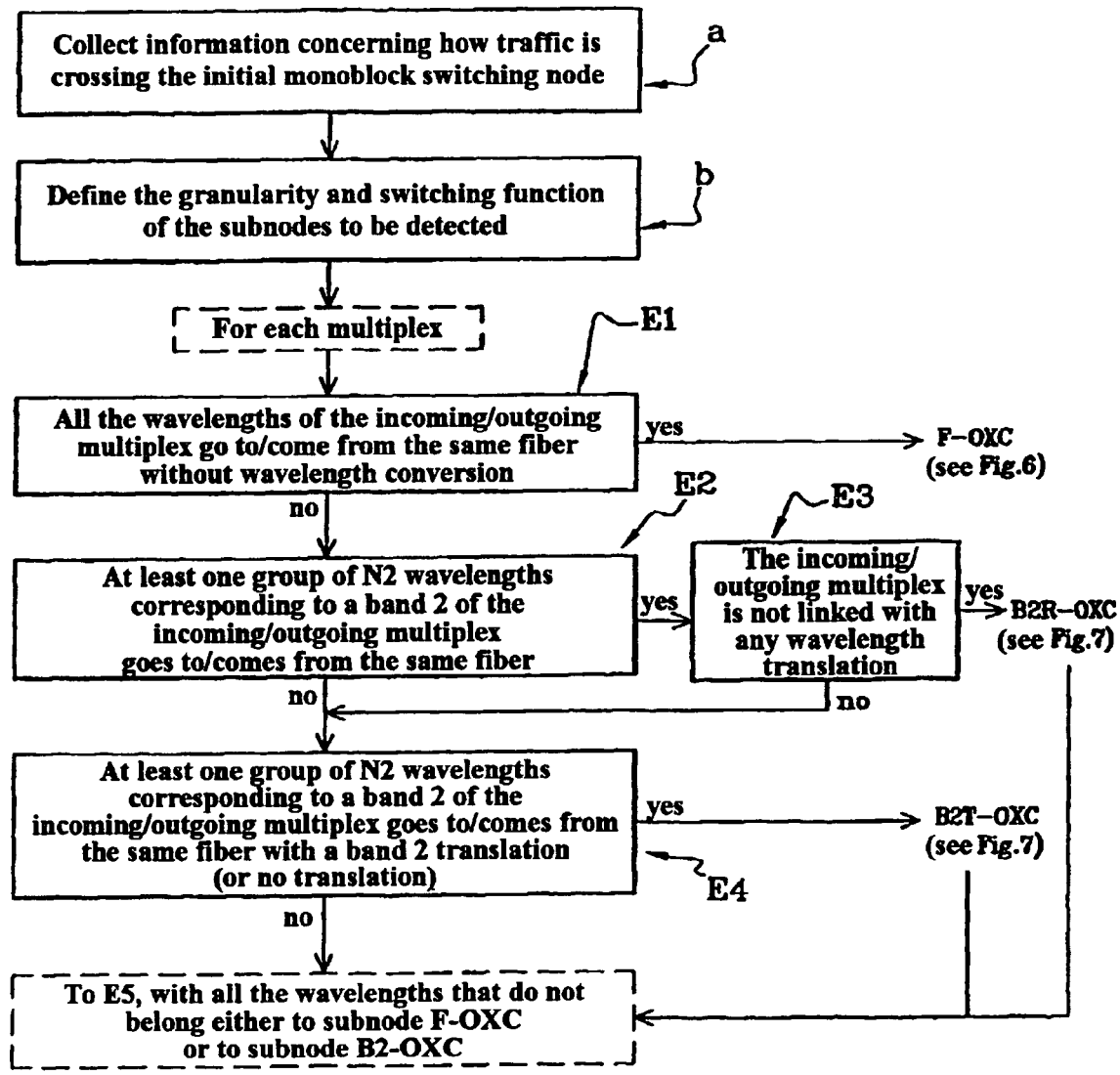
FIGS. 5A, 5B, 6, 7, 8 and 9 show various steps and substeps of a method according to the invention.
Figure 5B:
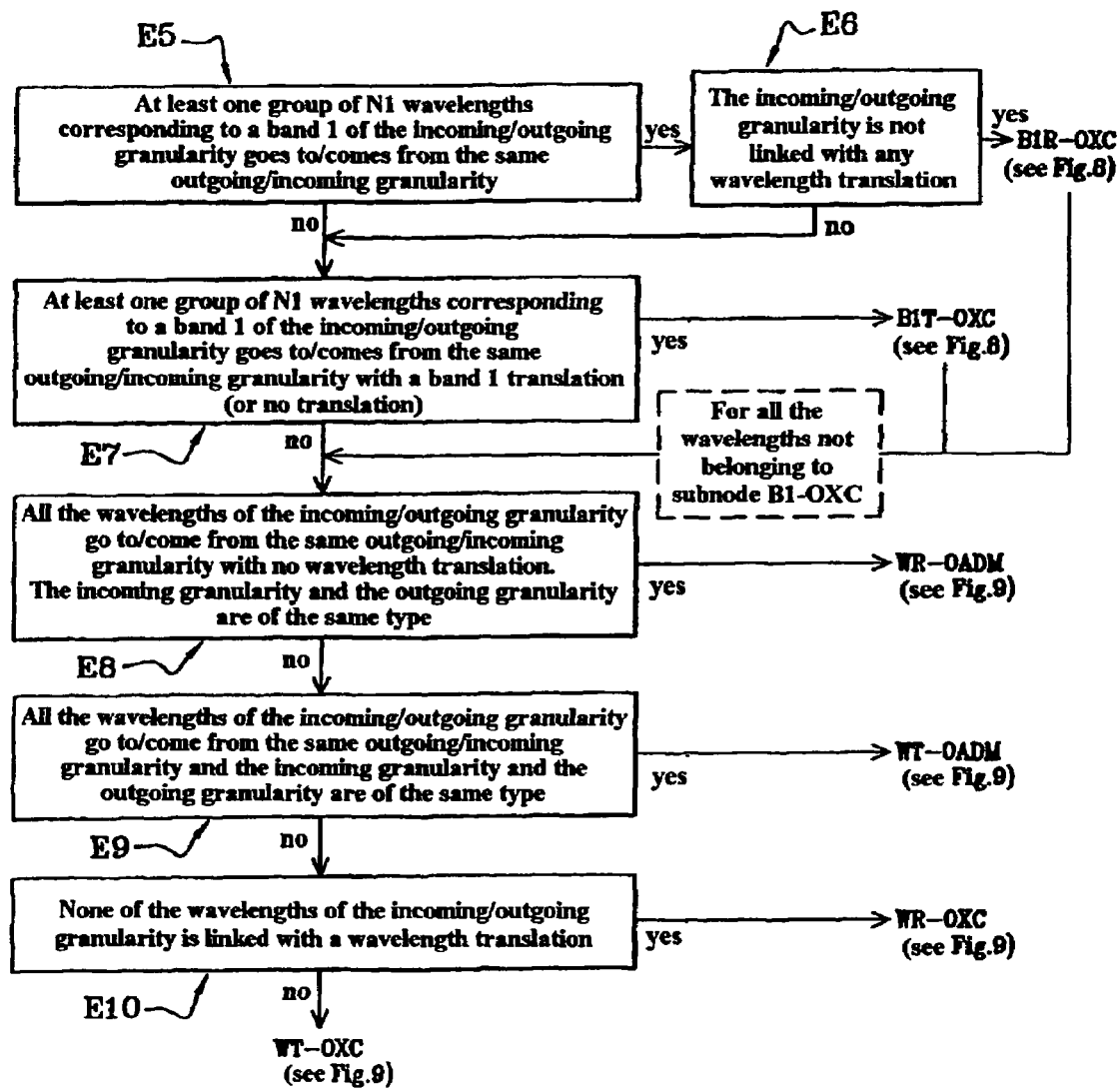

The stringing of steps E1 through E10, shown in FIGS. 5A and 5B, is based on considering each subnode in succession in an order corresponding to decreasing switching constraints. The highest switching constraints corresponds to the highest level of granularity, i.e. to the fiber, and to a switching with no wavelength translation. The lowest switching constraint corresponds to the lowest level of granularity, i.e. the wavelength, and to a switching with wavelength translation.

Detection therefore starts from the highest level of granularity and proceeds toward the lowest level granularity, first with no wavelength translation and then with wavelength translation. The chosen order provides the most comprehensive detection, taking all possible subnodes into account.

For each subnode, each of steps E1 to E10 selects all or part of the traffic of an incoming granularity that satisfies the switching constraints of the subnode concerned.

Accordingly, for each multiplex, representing all the wavelengths of a fiber, a first step E1 consists in detecting if all the wavelengths of the incoming multiplex are going to the same fiber, with no wavelength conversion, and if all the wavelengths of the outgoing multiplex come from the same fiber, with no wavelength conversion. It is essential to verify both directions.

Figure 6:
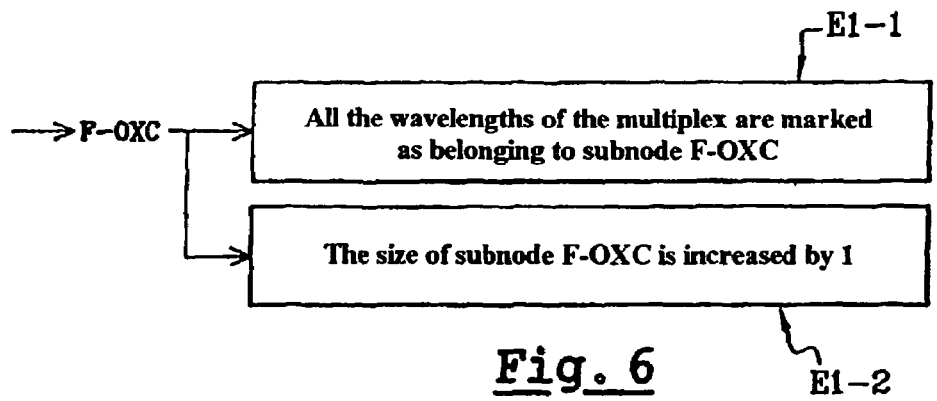

If the conditions of step E1 are satisfied, this signifies that a fiber granularity subnode has been identified. The output parameters of the detection algorithm are then modified as described below with reference to FIG. 6, which shows sub-steps E1-1 and E1-2 of step E1.

In sub-step E1-1, on the one hand, all the wavelengths of the multiplex considered are "marked" as belonging to the fiber level of granularity subnode F-OXC.

In step E1-2, on the other hand, the size of the subnode F-OXC is increased by 1, i.e. the number of ports allocated to the subnode F-OXC is incremented by 1.

If a multiplex does not correspond to the criteria of step E1, the same processing must be applied at a lower level of granularity, i.e. the band 2 level of granularity.

Accordingly, for each multiplex that does not satisfy step E1, a step E2 detects if at least one group of N2 wavelengths corresponding to a band 2 of the incoming multiplex is going to the same fiber and if at least one group of N2 wavelengths corresponding to a band 2 of the outgoing multiplex is coming from the same fiber. If step E2 is satisfied, the algorithm must still verify in a step E3 that the incoming and outgoing multiplexes are not linked with any wavelength translation. The algorithm invokes the ricochet function for verifying the link with a conversion to apply it to the incoming multiplex. It is not necessary to apply the ricochet function for verifying the link with a conversion to the outgoing multiplex because the outgoing multiplex is verified during application of that function to the incoming multiplex. The object of applying the ricochet verification function to the incoming multiplex is to ensure that the band 2 granularity is not linked to any wavelength translation before detecting it as having to be switched in the routing subnode B2R-OXC. The use of the ricochet verification function has already been described hereinabove with reference to an example based on a wavelength level of granularity.

Figure 7:
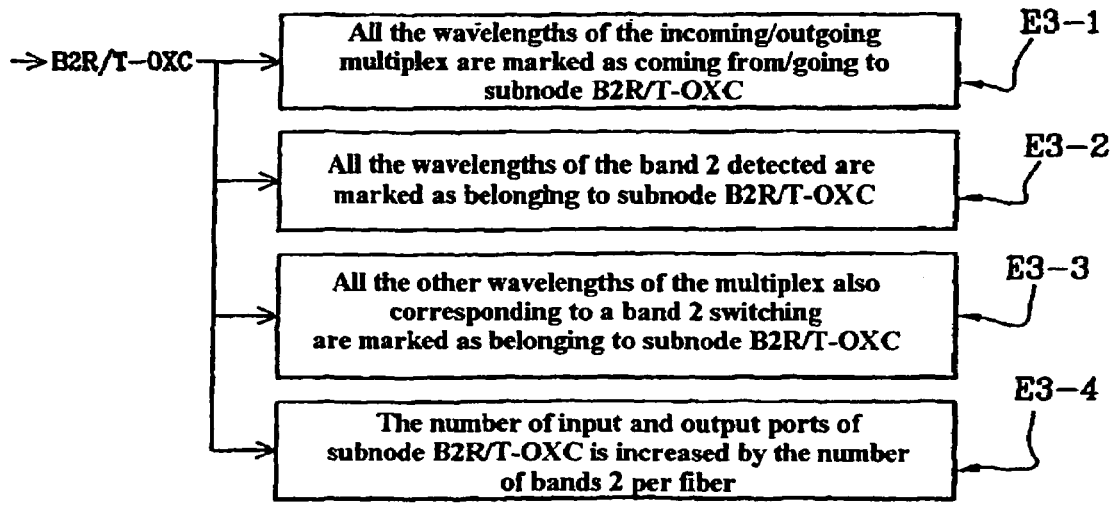

If application of the ricochet verification function to the incoming multiplex is successful, the output parameters of the detection algorithm are then modified as described below with reference to FIG. 7, which shows substeps E3-1 to E3-4 of steps E3 and E4. In this instance, where FIG. 7 shows the substeps of step E3, B2R-OXC must be substituted for B2R/T-OXC in FIG. 7.

Initially, in substep E3-1, all the wavelengths of the incoming multiplex are "marked" as coming from the subnode B2R-OXC and all the wavelengths of the outgoing multiplex are marked as going to the subnode B2R-OXC. This marking is of benefit in the event of internal traffic in the switching node. It provides a way to keep a trace of the passage of the multiplex in the band 2 level of granularity switching node. Accordingly, the detection algorithm deduces that a wavelength of the multiplex has entered the node at the band 2 subnode level. This has a major impact on the number of ports, because it is necessary to add the ports for inserting and extracting the internal traffic.

Secondly, in substep E3-2, all the wavelengths of the band 2 detected are marked as belonging to the switching subnode B2R-OXC. Equally, in substep E3-3, all the other wavelengths of the multiplex also corresponding to band 2 switching are marked as belonging to the switching subnode B2R-OXC. Finally, in substep E3-4, the number of input and output ports of the switching subnode B2R-OXC is increased by the number of bands 2 per fiber.

Assuming that a multiplex does not satisfy the criteria of step E2 of the detection algorithm, or that, if it did satisfy them, invoking the ricochet verification function in step E3 showed the link with a wavelength conversion, a step E4 consists of detecting if at least one group of N2 wavelengths corresponding to band 2 of the incoming multiplex is going to the same fiber with a band 2 translation and if that group of N2 wavelengths corresponding to a band 2 of the outgoing multiplex comes from the same fiber with a band 2 translation.

If this is the case, the output parameters of the detection algorithm are then modified in the same manner as in the event of detecting the switching subnode B2R-OXC, as described with reference to FIG. 7. The substeps E3-1, E3-2, E3-3 and E3-4 are therefore applied again. The only difference is that the situation is that of detecting the switching subnode B2T-OXC. Thus B2T-OXC must be substituted for B2R/T-OXC in FIG. 7.

If the switching subnode B2R-OXC is not detected before the switching subnode B2T-OXC, then the subnode B2R-OXC will never be detected. In this case, for all of the traffic corresponding to band 2 switching to be taken account of anyway at the switching subnode B2T-OXC, a constraint is added to step E4 of the detection algorithm. The added constraint is shown in parentheses in block E4 in FIG. 5A and consists in also detecting if at least one group of N2 wavelengths corresponding to a band 2 of the incoming multiplex is going to the same fiber with no translation and if that group of N2 wavelengths corresponding to a band 2 of the outgoing multiplex is coming from the same fiber with no translation.

FIG. 5B shows the sequence of steps of the algorithm relating to detecting wavelengths that do not belong either to an F-OXC type switching subnode or to a B2-OXC type switching subnode.

Until now, the incoming and outgoing granularities considered have consisted of a complete multiplex. However, the incoming and outgoing granularities may correspond to fiber, band 2 or band 1 traffic. The description of the steps in FIG. 5B therefore refers to incoming granularity and outgoing granularity in order to retain the same notation for all the steps.

Referring to FIG. 5B, step E5 detects if at least one group of N1 wavelengths corresponding to a band 1 of the incoming granularity, i.e. a fiber or a band 2, is going to the same outgoing granularity, and if that group of N1 wavelengths corresponding to a band 1 of the outgoing granularity is coming from the same incoming granularity. If that condition is satisfied, the algorithm still has to verify that the incoming granularity is not linked with any wavelength conversion. That verification is performed in step E6. The algorithm invokes the ricochet function for verifying the link with a conversion in order to apply it to the incoming granularity. In the same way as for the band 2 granularity in step E3, it is not necessary to apply that function to the outgoing granularity, which has already been verified on applying the function to the incoming granularity. The object of invoking the ricochet verification function is to ensure that the incoming granularity is not linked to any wavelength translation before detecting it as having to be switched in the band 1 level routing subnode.

Figure 8:
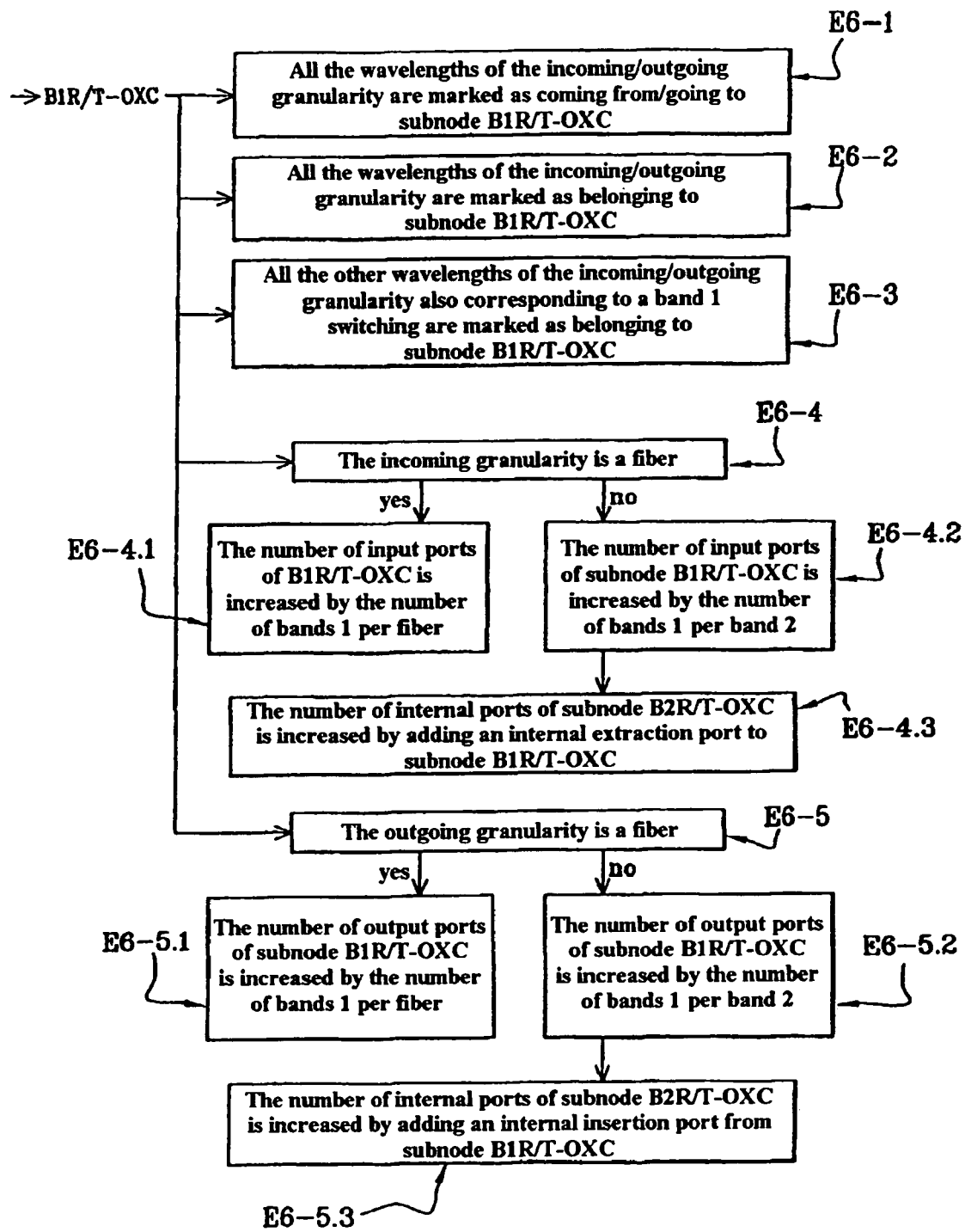

Accordingly, if applying the ricochet verification function to the incoming granularity is successful, the output parameters of the detection algorithm are then modified as described below with reference to FIG. 8, which shows substeps E6-1 to E6-3.5 of steps E6 and E7. In this instance, B1R-OXC must be substituted for B1R/T-OXC in FIG. 8.

Initially, substep E6-1 marks all the wavelengths of the incoming granularity as coming from subnode B1R-OXC and all the wavelengths of the outgoing granularity as going to subnode B1R-OXC. In the same way as before, the function of this marking is to keep a trace of the passage of the incoming granularity in the band 1 granularity switching node. Accordingly, the detection algorithm deduces that a wavelength of that incoming granularity entered the node at the band 1 subnode level. This information is important in the context of internal traffic because it is necessary to add the insertion or extraction ports. Secondly, in substep E6-2, all the wavelengths of the detected band 1 are marked as belonging to the switching node B1R-OXC. Substep E6-3 marks all the other wavelengths of the incoming granularity also corresponding to band 1 switching as belonging to the switching subnode B1R-OXC and all the other wavelengths of the outgoing granularity corresponding also to band 1 switching as belonging to the subnode B1R-OXC. As for incrementing the inputs of the switching subnode B1R-OXC, it is necessary to distinguish between two cases:

Substep E6-4 distinguishes the case in which the incoming granularity is a fiber. In this case, in substep E6-4.1, the number of input ports of the switching subnode B1R-OXC is increased by the number of bands 1 per fiber.

If substep E6-4 concludes that the incoming granularity is not a fiber, then the incoming granularity is a band 2. The situation is one of internal traffic at the switching node. Substep E6-4.2 then increases the number of input ports of the switching subnode B1R-OXC by the number of bands 1 per band 2. Also, because the incoming granularity is a band 2, it is also necessary to increase the number of internal ports of the subnode B2R/T-OXC. Substep E6-4.3 therefore increases the number of internal ports of the subnode B2R/T-OXC by an internal extraction port to the subnode B1R-OXC.

As for incrementing the outputs of the switching subnode B1R-OXC, it is necessary to distinguish between two cases, in the same way as for the inputs.

Substep E6-5 distinguishes the case in which the outgoing granularity is a fiber. In this case, in substep E6-5.1, the size of the output of the switching subnode B1R-OXC is increased by the number of bands 1 per fiber.

Otherwise, substep E6-5.2 increases the number of output ports of the switching subnode BIR-OXC by the number of bands 1 per band 2. Also, the outgoing granularity being a band 2, it is equally necessary to increment the number of internal ports of the subnode B2R/T-OXC. Substep E6-5.3 therefore increases the number of internal ports of the subnode B2R/T-OXC by an internal insertion port coming from the subnode B1R-OXC.

Assuming that an incoming granularity does not satisfy the constraints of step E5 of the detection algorithm or that, if it did satisfy them, invoking the ricochet verification function in step E6 showed the link with a wavelength conversion, the algorithm proceeds to the next step.

Step E7 detects if at least one group of N1 wavelengths corresponding to a band 1 of the incoming granularity is going toward the same outgoing granularity with a band 1 translation and if at least one group of N1 wavelengths corresponding to a band 1 of the outgoing granularity comes from the same incoming granularity with a band 1 translation.

If so, the output parameters of the detection algorithm are modified as described with reference to FIG. 8, and in the same way as in the case of detecting the switching subnode B1R-OXC. Substeps E6-1 to E6-5.3 are therefore applied again. The only difference is that the situation is one of detecting the switching subnode B1T-OXC. It is therefore necessary to substitute B1T-OXC for B1R/T-OXC in FIG. 8.

If the switching subnode B1R-OXC is not detected before the switching subnode B1T-OXC is detected, the subnode B1R-OXC will never be detected. In this case, in order for all of the traffic corresponding to a band 1 switching nevertheless to be taken into account at the switching subnode B1T-OXC, a constraint is added in step 7 of the detection algorithm. The added constraint is shown in brackets in block E7 of FIG. 5B and consists of detecting if at least one group of N1 wavelengths corresponding to a band 1 of the incoming granularity is going to the same outgoing granularity with no translation and if at least one group of N1 wavelengths corresponding to a band 1 of the outgoing granularity come from the same incoming granularity with no translation.

At this stage, it remains to apply the detection algorithm to all wavelengths that do not belong to an F-OXC type switching node, a B2-OXC type switching node or a B1-OXC type switching node. In other words, all the remaining traffic that it has not been possible to process at these highest levels of granularity. The incoming and outgoing granularities can be fiber, band 2 or band 1 traffic.

Step E8 detects if all the wavelengths of the incoming granularity are going to the same outgoing granularity with no wavelength translation and if all the wavelengths of the outgoing granularity came from the same incoming granularity with no wavelength translation. Step E8 also verifies if the incoming and outgoing granularity are of the same type. This step detects the switching subnode WR-OADM. In this step, the ricochet function for verifying the link with a conversion is applied to ensure that the incoming granularity is not linked to any wavelength translation before it is detected as having to be switched in the switching subnode WR-OADM.

Figure 9:
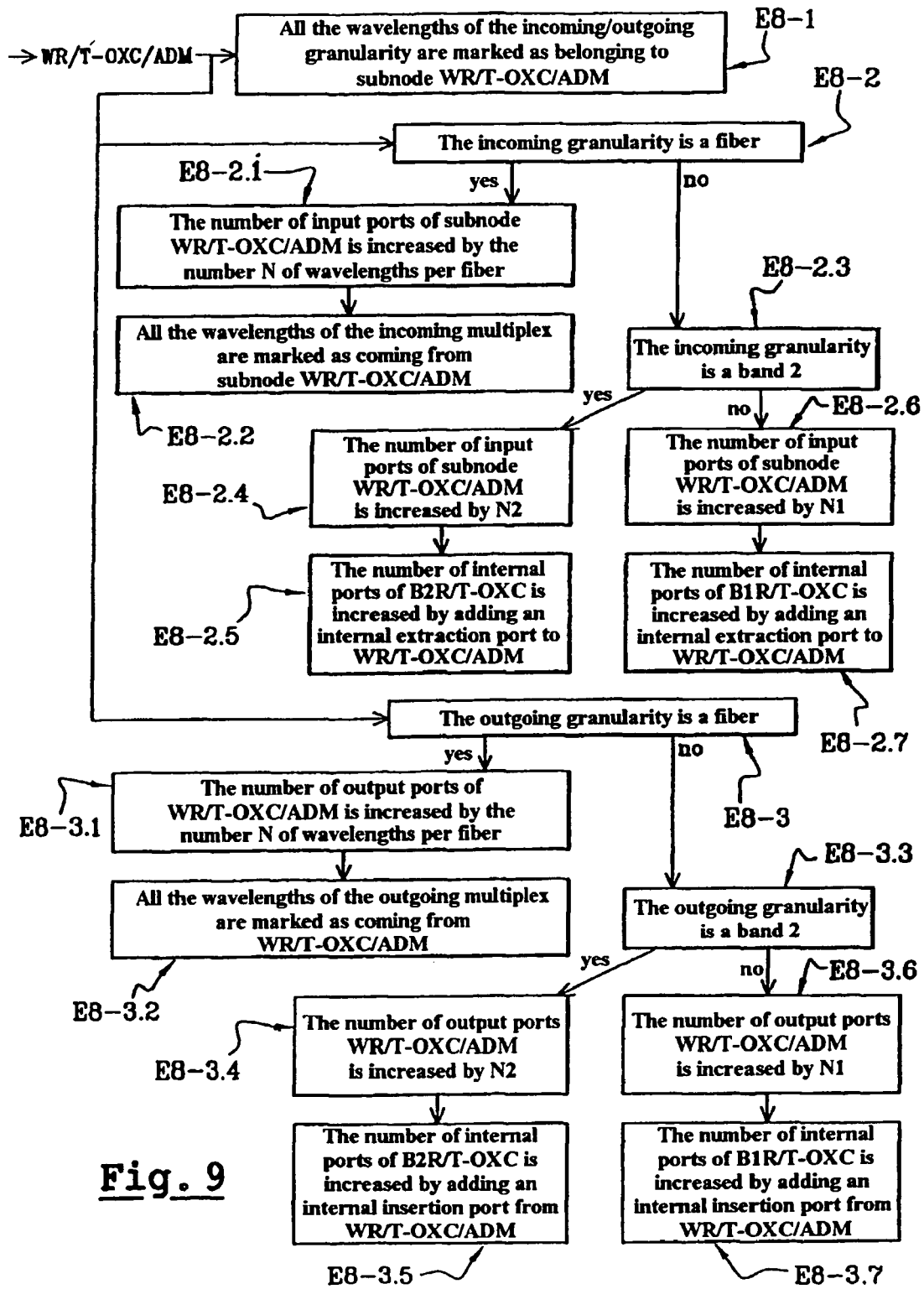

If the two conditions of E8 are satisfied, then the output parameters of the detection algorithm are modified as described with reference to FIG. 9, which shows substeps E8-1 to E8-3.7 of steps E8, E9 and E10. In this case, WR-OADM must be substituted for WR/T-OXC/ADM in FIG. 9.

Initially, substep E8-1 marks all the wavelengths of the incoming granularity as belonging to the switching subnode WR-OADM and all the wavelengths of the outgoing granularity as belonging to the subnode WR-OADM.

As to incrementing the inputs and outputs of the switching subnode WR-OADM, it is a matter of distinguishing between several situations, depending on the incoming granularity type.

Firstly, in substep E8-2, whether the incoming granularity is a fiber is detected. If so, in substep E8-2.1, the number of input ports of the subnode WR-OADM is increased by the number N of wavelengths per fiber and in substep E8-2.2 all the wavelengths of the incoming multiplex are marked as coming from the subnode WR-OADM.

Substep E8-2.3 detects if the incoming granularity is a band 2 thanks to the marking of the wavelength as coming from B2R/T-OXC. If so, then substep E8-2.4 increases the number of input ports of the subnode WR-OADM by the number N2 of wavelengths per band 2. Also, in step E8-2.5, the number of internal ports of the subnode B2R/T-OXC is increased by adding an internal extraction port to the subnode WR-OADM.

If the incoming granularity is not a band 2, substep E8-2.6 increases the number of input ports of the subnode WR-OADM by the number N1 of wavelengths per band 1. Also, in step E8-2.7, the number of internal ports of the subnode B1R/T-OXC is increased by adding an internal extraction port to the subnode WR-OADM.

With regard to the outputs, substep E8-3 detects if the outgoing granularity is a fiber. If so, substep E8-3.1 increases the number of output ports of the subnode WR-OADM by the number N of wavelengths per fiber. Also, in substep E8-3.2, all the wavelengths of the outgoing multiplex are marked as coming from the subnode WR-OADM.

Substep E8-3.3 detects if the outgoing granularity is a band 2 thanks to the marking of the wavelengths as going to B2R/T-OXC. In this case, substep E8-3.4 increases the number of output ports of the subnode WR-OADM by the number N2 of wavelengths per band 2. Also, in substep E8-3.5, the number of internal ports of the subnode B2R/T-OXC is increased by adding an internal insertion port from the subnode WR-OADM.

Finally, if the outgoing granularity is not a band 2, substep E8-3.6 increases the number of output ports of the subnode WR-OADM by the number N1 of wavelengths per band 1. Also, in substep E8-3.7, the number of internal ports of the subnode B1R/T-OXC is increased by adding an internal insertion port from the subnode WR-OADM.

If the incoming granularity does not satisfy the conditions of step E8, step E9 for detecting the switching subnode WT-OADM detects if all the wavelengths of the incoming granularity are going to the same outgoing granularity and if all the wavelengths of the outgoing granularity are coming from the incoming granularity. Step E9 also verifies if the incoming and outgoing granularities are of the same type. Thus there is no question here of finding out whether there are any wavelength conversions.

If the constraints of E9 are satisfied by the incoming granularity and by the outgoing granularity, the output parameters of the detection algorithm are modified in the same way as for detecting the switching subnode WR- OADM as described with reference to FIG. 9. Substeps E8-1 to E8-3.7 therefore are present again, but WT-OADM must be substituted for WR/T-OXC/ADM.

Finally, if none of the preceding conditions is satisfied, the algorithm goes to a final step E10. Step E10 corresponds to detection of the lowest level of granularity switching subnode WR/T-OXC. This subnode takes into account all wavelengths that have not been switched at higher levels of granularity. Subnode WR/T-OXC is the last subnode to be detected in the string of steps of the algorithm; it is the one with the lowest switching constraints.

E10 detects if any of the wavelengths of the incoming granularity is linked to a wavelength conversion. The ricochet verification function is invoked in order to apply it to the incoming granularity, which is therefore verified for the outgoing granularity, as previously. There is no verification as to whether the incoming granularity and the outgoing granularity are of the same type.

If application to the incoming granularity of the ricochet function for verifying the link to a conversion is successful, i.e. if there is no wavelength translation, this means that a WR-OXC type switching subnode has been detected. The output parameters of the detection algorithm are modified in the same way as previously on detecting the subnodes WR-OADM and WT-OADM, as described with reference to FIG. 9. Substeps E8-1 to E8-3.7 of FIG. 9 apply again, but substituting WR-OXC for WR/T-OXC/ADM.

On the other hand, if there is a link with a wavelength translation, a WT-OXC type switching subnode has been detected. The output parameters of the detection algorithm are modified in the same way as for detecting the switching subnode WR-OXC. Substeps E8-1 to E8-3.7 of FIG. 9 are applied again, but substituting WT-OXC for WR/T-OXC/ADM.

The method in accordance with the invention therefore proceeds in four phases. A first phase collects information concerning how the traffic is crossing the initial monoblock node; a second phase consists of defining the subnodes to be looked for in terms of their granularity and their switching function; a third phase considers each subnode successively in an order corresponding to decreasing switching constraints, i.e. the order given by the string of steps E1 to E10; finally, for each subnode, a last phase selects all or part of the traffic of an incoming granularity that satisfies the switching constraints of the subnode concerned. This last phase, which is the detection phase proper, combines all steps E1 to E10. It is the conditions set at each of steps E1 to E10 that effect this selection phase proper.

The last phase of the method breaks down into a plurality of subphases that provide usable information on exiting the algorithm. In particular, at the end of the process, the information collected indicates how the internal traffic is distributed in the optical switch. The detection algorithm retains a trace of the traffic passing into any subnode of the switch. This result is obtained by marking all the traffic of the incoming granularity, all of which or only some of which satisfies the switching constraints of a subnode, as coming from the switching subnode concerned and marking all the traffic of the outgoing granularity as going to the switching subnode concerned. This marking subphase retains a trace of the internal traffic and is implemented in substeps E3-1, E6-1 and E8-2.2 of the detection method that respectively correspond to marking wavelengths coming from subnode B2R/T-OXC, wavelengths coming from subnode B1T/T-OXC, and wavelengths coming from subnode WR/T-OXC/ADM.

The information obtained at the end of the process also shows how the traffic is distributed in the subnodes detected. This result is obtained by marking the traffic that satisfies the switching constraints of a particular subnode as belonging to that node. This marking subphase, which thereafter enables the traffic to be distributed to the various subnodes, is implemented in substeps E1-1, E3-2, E3-3, E6-2, E6-3 and E8-1, which respectively correspond to marking wavelengths belonging to subnode F-OXC, wavelengths belonging to subnode B2R/T-OXC, wavelengths belonging to subnode B1R/T-OXC, and wavelengths belonging to subnode WR/T-OXC/ADM.

Finally, the detection algorithm gives the size of each subnode actually necessary for switching, i.e. the number of ports of the subnode. This result is obtained by increasing the number of input and output ports and the number of internal insertion and extraction ports of a subnode each time that some or all of the traffic of an incoming granularity satisfies the switching constraints of the subnode concerned. This subphase consists of increasing the number of ports of the subnode concerned and is effected during substeps E1-2, E3-4, E6-4.1 to E6-4.3, E6-5.1 to E6-5.3, E8-2.4 to E8-2.7 and E8-3.4 to E8-3.7 of the detection algorithm. The increase in the number of ports is naturally related to the incoming and outgoing granularity.

The detection method according to the invention represents the initial node as a stack of detected subnodes.

The invention claimed is:

1. A method of detecting switching subnodes in a monoblock wavelength division multiplex optical switching node, each subnode corresponding to a given level of granularity and to a given switching function, wherein the method comprises the following steps:
   (a) collecting information concerning how traffic is crossing an initial monoblock switching node;
   (b) defining the granularity and switching function of the subnodes to be detected by successively detecting:
      (b1) the fiber level optical switching subnode;
      (b2) the band level optical switching network with a direct routing function, without band translation;
      (b3) the band level optical switching subnode with subband translation;
      (b4) the wavelength level optical switching subnode with a direct routing function, without wavelength translation; and
      (b5) the wavelength level optical switching subnode with wavelength translation;
   (c) considering each subnode successively in an order corresponding to reducing switching constraints; and
   (d) for each subnode, selecting all or part of the traffic of an incoming granularity and an outgoing granularity that satisfy the switching constraints of the subnode concerned.

2. The method claimed in claim 1 wherein said information collected in step (a) is information contained in the initial switching matrix of the monoblock node whose subnodes are to be detected.

3. The method claimed in claim 1, wherein the method further comprises detecting:
   (b6) the subnode corresponding to an insert/extract multiplexer with a direct routing function without wavelength translation; and
   (b7) the subnode corresponding to an insert/extract multiplexer with wavelength translation.

4. The method claimed in claim 3 wherein steps (b2), (b4) and (b6) use a ricochet function for verifying the link with a conversion on any incoming granularity that may be switched in a routing subnode to prevent all internal traffic between subnodes having the same level of granularity.

5. The method claimed in claim 4, wherein the ricochet function for verifying the link with a conversion comprises the following looped steps:
   (i) verifying that none of the wavelengths of the incoming granularity is linked with a translation;
   (j) verifying that none of the wavelengths of the outgoing granularity or granularities corresponding to the incoming granularity is linked with a translation;
   (k) marking the wavelengths verified to prevent looping; and
   (l) for each outgoing granularity, applying the function for verifying the link with a conversion again to all of the wavelengths constituting the incoming granularity of the wavelengths constituting the outgoing granularity.

6. The method claimed in claim 1, wherein step (d) comprises the following substeps:
   (d1) marking all of the traffic of the incoming granularity as coming from the subnode concerned and all the traffic of the outgoing granularity as going to the subnode concerned;
   (d2) marking the traffic that satisfies the switching constraints of the subnode concerned as belonging to that subnode; and
   (d3) increasing the number of ports of the subnode concerned.

7. The method claimed in claim 1, wherein said switching constraints are independent of capacity of a switching path.

8. The method claimed in claim 1, wherein said switching constraints include a constraint that no internal traffic can be generated between subnodes that have the same level of granularity.

9. The method claimed in claim 1 wherein said switching constraints include the constraint that for a given subnode, the method cannot switch one portion of a multiplex with wavelength translation and another portion of said multiplex without wavelength translation.

10. A method of detecting switching subnodes in a monoblock wavelength division multiplex optical switching node, each subnode corresponding to a given level of granularity and to a given switching function, wherein the method comprises the following steps:
    (a) collecting information concerning how traffic is crossing an initial monoblock switching node;
    (b) defining the granularity and switching function of the subnodes to be detected, wherein the step detects successively:
        (b1) the fiber level optical switching subnode;
        (b2) the band level optical switching network with a direct routing function without band translation;
        (b3) the band level optical switching subnode with subband translation;
        (b4) the subband level optical switching subnode with a direct routing function without subband translation;
        (b5) the subband level optical switching subnode with subband translation;
        (b6) the wavelength level optical switching subnode with a direct routing function without wavelength translation; and
        (b7) the wavelength level optical switching subnode with wavelength translation;
    (c) considering each subnode successively in an order corresponding to reducing switching constraints; and
    (d) for each subnode, selecting all or part of the traffic of an incoming granularity and an outgoing granularity that satisfy the switching constraints of the subnode concerned.

11. The method claimed in claim 10 wherein said information collected in step (a) is information contained in the initial switching matrix of the monoblock node whose subnodes are to be detected.

12. The method claimed in claim 10, wherein the method further comprises detecting:
    (b8) the subnode corresponding to an insert/extract multiplexer with a direct routing function without wavelength translation; and
    (b9) the subnode corresponding to an insert/extract multiplexer with wavelength translation.

13. The method claimed in claim 12 wherein steps (b2), (b4), (b6) and (b8) use a ricochet function for verifying the link with a conversion on any incoming granularity that may be switched in a routing subnode to prevent all internal traffic between subnodes having the same level of granularity.

14. The method claimed in claim 13, wherein the ricochet function for verifying the link with a conversion comprises the following looped steps:
    (i) verifying that none of the wavelengths of the incoming granularity is linked with a translation;
    (j) verifying that none of the wavelengths of the outgoing granularity or granularities corresponding to the incoming granularity is linked with a translation;
    (k) marking the wavelengths verified to prevent looping; and
    (l) for each outgoing granularity, applying the function for verifying the link with a conversion again to all of the wavelengths constituting the incoming granularity of the wavelengths constituting the outgoing granularity.

15. The method claimed in claim 10, wherein step (d) comprises the following substeps:
    (d1) marking all of the traffic of the incoming granularity as coming from the subnode concerned and all the traffic of the outgoing granularity as going to the subnode concerned;
    (d2) marking the traffic that satisfies the switching constraints of the subnode concerned as belonging to that subnode; and
    (d3) increasing the number of ports of the subnode concerned.

* * * * *